Dec. 19, 1944.   E. W. KELLOGG ET AL   2,365,474
TRAFFIC TRANSPORTATION SIGNALING SYSTEM
Filed April 29, 1942

Inventors
Edward W. Kellogg
& Glenn L. Dimmick
By
Attorney

Patented Dec. 19, 1944

2,365,474

UNITED STATES PATENT OFFICE 2,365,474

TRAFFIC TRANSPORTATION SIGNALING SYSTEM

Edward W. Kellogg and Glenn L. Dimmick, Indianapolis, Ind., assignors to Radio Corporation of America, a corporation of Delaware Application April 29, 1942, Serial No. 440,924

1 Claim. (Cl. 177—329)

This invention relates to traffic signaling systems and more particularly to railway signaling lights used for informing trainmen of the condition of the railroad ahead.

Heretofore, in railway signal lights, used for informing the engineer whether he should proceed, slow down, or stop, etc., considerable difficulty has been encountered because of the fact that sunlight, under certain conditions, has been reflected from within the signal lights, giving a false signal. In a certain angular range between the light rays from the sun to the signal light and the line of view of the observer, the sun's rays have caused apparent illumination, the same as that caused by the incandescent signal lamp. The uncolored reflected sunlight is not serious, although it tends to blind the observer to the true signal. However, some of the sunlight is reflected after passing through the colored glass. This effect has been known as a "false clear" and has been the cause of many serious accidents. This trouble has persisted for many years without apparently any solution.

An object of our invention is to provide a signal light that is free of "false clear" signals caused by light from an external source, such as the sun.

We discovered that the trouble was caused by light from the sun, transmitted through the lenses, striking the surfaces of the lamp bulb, and being reflected out again as colored light through the lenses, thereby giving the "false clear" signal. This observation was proven by the fact that when the signal lamp within the optical structure was completely removed, the troublesome reflected light was reduced to a negligible quantity.

The invention will be described herein in connection with a railway signaling system of the type above referred to, and its scope will be pointed out in the appended claim. For a further consideration of the invention, attention is now directed to the following description in connection with the accompanying drawing, in which Figure 1 is a side plan view, in section, diagrammatically representing the major portions of a conventional railway signaling lamp and optical system, embodying a species of the invention, Figure 2 is a side view, partly in cross section, of a railway lamp optical system and our improved lamp embodying the preferred form of the invention.

Figure 1:
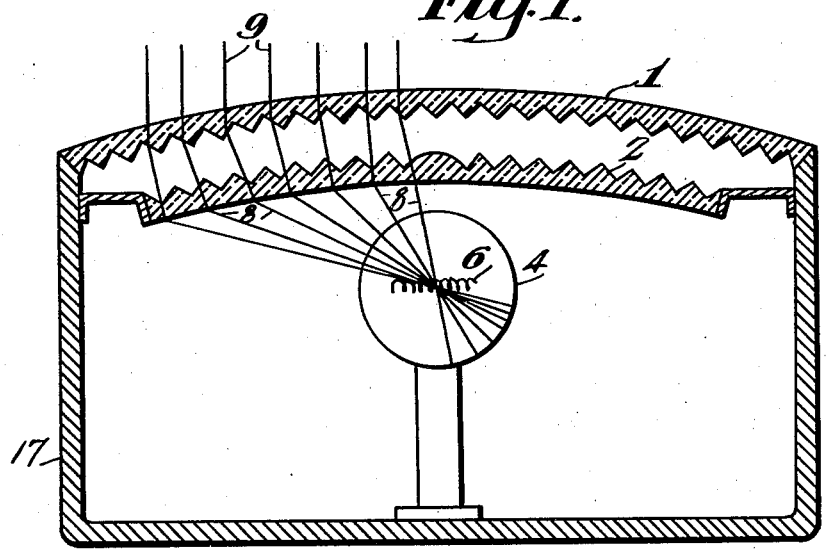
Figure 2:
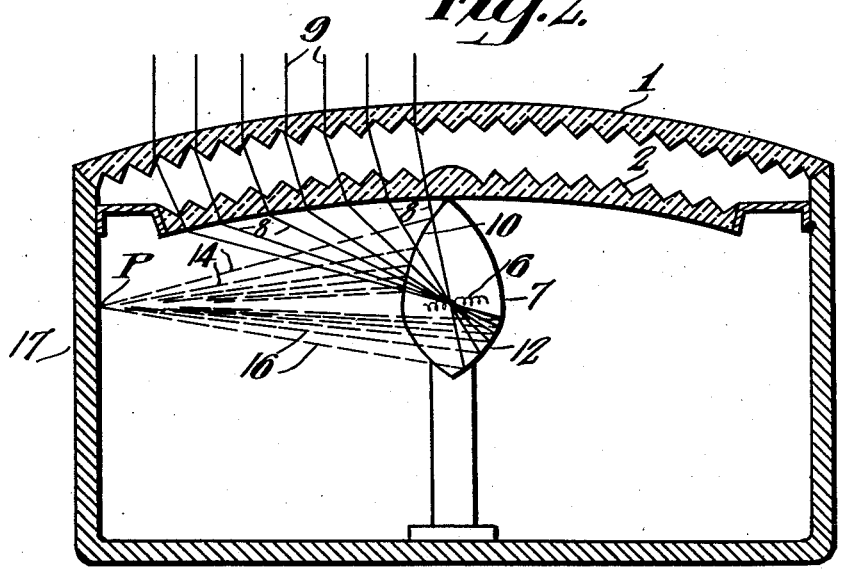

Referring to Figure 1, we have illustrated a conventional railway signaling optical system consisting of a colored glass Fresnel lens 1 and clear glass lens 2 to the rear of which lenses is located a spherical shaped lamp bulb 4 having a filament 6 located in the center of the lamp bulb. Light rays 8 from the lamp filament are refracted by the lenses 1 and 2, as indicated for a portion of the system, to form a substantially parallel beam emerging from the lenses, as shown at 9. Light from a distant source, such as the sun, coming from the opposite direction, and striking the lenses, is caused to converge to the filament, as may be illustrated by the lines representing the outgoing light rays 9 and 8 above discussed. It is apparent that rays reflected from the spherical bulb, at both the outer and inner forward surfaces at 10 and from the inner and outer rear surfaces at 12, are directed back over their same path and leave the lenses as substantially a parallel beam, illustrated at 9.

We found that if the outside surface of the lamp was coated with a suitable material, the reflected light was greatly reduced, as is known in the art. Coating or otherwise treating of the outer surface, only, of the lamp was found to reduce the light reflected to about 50 percent, but this amount was not sufficient because to the eye it was not a very large reduction. Coating the outside is quite practical with the existing bulbs, but it is quite a problem to construct a lamp with the inside surface coated, as would be necessary for a more substantial reduction. Any suitable method of coating or treating the glass surface may be used. See, for example, F. H. Nicoll "A new chemical method of reducing reflectance of glass" in RCA Review, January, 1942, and K. B. Blodgett Physical Review 55, page 391 to 404 of February 15, 1939.

The reflection-reducing expedient previously referred to has the property of producing minimum reflection at a certain wave length. Incidentally, the transmission of light is most efficient at the same wave length. It is possible in a modification of the above-mentioned process to reduce reflection to a lower value at the minimum point if some increase in reflection at other wave lengths may be tolerated. In the present application it is particularly important that reflection of green light from the green signal and red light from the red signal be reduced to minimum.

Referring to Figure 2, there is illustrated the same optical system, including lenses 1 and 2, but with a lamp 7 having a different and non-spherical contour bulb or envelope, and a filament 6 or other source of light therein. In accordance with our invention, we have designed the shape of the bulb such that for all incoming light beams 9 and 8 striking the forward surfaces around 10 and the rear surfaces around 12, the light beams 14 and 16 are reflected from these surfaces, respectively, and converge at, or near, some annular line or area P laterally of the lamp and at such a location, e. g., the inside wall of the housing 17, that these reflected rays do not pass out again through the lenses. The reflected rays 14 and 16 travel in a direction outside the conical angle formed between the filament and outer periphery of lens 1 and fall, preferably, on light absorbing or dissipating surface, or surfaces, thereby preventing a re-reflection. These reflected rays are thus prevented from returning along their original path 8 to an observer, and the signal lamp appears practically dark, although the sun's rays fall upon its surfaces as indicated by rays 8. We have, therefore, by this arrangement, eliminated the "false clear" signal. The outwardly projected useful rays from filament 6 follow the paths 8 and 9 as usual, the filament being located in the same position relative to the lenses as that in Figure 1. We have shown the light rays for one portion of the system, but the same applies to other portions.

In Figure 2 the design of the glass envelope enclosing the filamentary light source is such that the forward portion around 10 is approximately conical, or convex-conical, and makes a sufficiently acute angle, or angles, with respect to the axis of rotation that radial rays passing from any part of lens 1 toward the filament will not strike any surface of said forward lamp portion normally thereto. In connection with this design, the tip of the bulb is preferably closely adjacent lens 1. The shape of the forward portion of the envelope is such that the incoming, or incident rays, will be reflected laterally to some region back of the lens system. The shape is derived by bisecting the angle between any ray 8 and the corresponding predetermined ray in groups 14 or 16, and making the envelope normal to the bisecting line at the point of intersection. The rear portion 12 of the envelope is more curved than the forward portion and, as shown, the reflected light will converge at P. However, it is not essential that it converge at the same line P, as do the rays from portion 10. In fact, the rear portion 12 can be shaped more like the forward portion 10, and the reflected rays will cover an area to the rear of P along the housing side walls 17. For want of a better term, we refer to the preferred lamp bulb generally as egg shape, and particularly as convex-conical at each end. Various departures may be made from the particular form illustrated without departing from our invention.

As an initial practical demonstration of the principle involved in our invention, we obtained a lamp bulb which has a shape approaching that illustrated in Figure 2, approximately resembling an egg or a pear in contour, and when placed in the position illustrated for operation, and compared with the original spherical lamp shown in Figure 1, it was found to be effective in reducing the reflected light to a negligible value in spite of the fact that the shape of this bulb was not ideal.

We have, therefore, provided two ways of solving the "false clear" signal problem; (a) by applying light reflection reducing coatings to the present spherical bulbs used in railway signal lamps, and (b) providing a signal lamp bulb with such a shape and location that the reflected light from an external source will be caused to travel in a path other than that which would cause an observer to receive the impression that he was viewing light rays from an active signal lamp. A combination of (a) and (b) may be used, and the invention may be applied to traffic lights for signaling automotive vehicles.

Various modifications and alterations in the present invention may be made, and it is desired that any and all such modifications and uses be considered within the purview of the present invention, except as limited by the following claim.

Having thus described our invention, what we claim as new is:

In an optical signaling system, a lamp envelope containing a source of light, a refracting lens for projecting light from said source outwardly from said system, and a substantially non-reflecting transparent coating on said lamp envelope for substantially reducing the reflection of external light entering said system while offering substantially no obstruction to the passage of said light from said source, said lens and said coating being characterized by the fact that the former transmits light of a predetermined color and the latter minimizes reflection of light of a similar color.

EDWARD W. KELLOGG.
GLENN L. DIMMICK.